United States Patent [19]
Nicholas

[11] Patent Number: 4,748,665
[45] Date of Patent: May 31, 1988

[54] ANALOG ECHO SUPPRESSOR

[75] Inventor: David C. Nicholas, Cedar Rapids, Iowa

[73] Assignee: Rockwell International Corporation, El Segundo, Calif.

[21] Appl. No.: 750,796

[22] Filed: Jul. 1, 1985

[51] Int. Cl.$^4$ ............................................. H04B 3/20
[52] U.S. Cl. ..................................... 379/407; 379/406
[58] Field of Search ............... 179/170.2, 170.6, 170.8, 179/81 B, 100 L; 379/387, 388, 389, 390, 399, 406, 407, 409

[56] References Cited

U.S. PATENT DOCUMENTS

| | | | |
|---|---|---|---|
| 3,821,494 | 6/1974 | Besseyre | 379/406 X |
| 4,012,603 | 3/1977 | Araseki et al. | 179/170.6 |
| 4,028,496 | 6/1977 | LeMarche et al. | 179/170.6 X |
| 4,028,506 | 6/1977 | Araseki et al. | 179/170.2 |
| 4,192,979 | 3/1980 | Jankowski, Jr. | 179/170.2 |
| 4,513,177 | 4/1985 | Nishino et al. | 179/81 B |
| 4,527,014 | 7/1985 | Styrna | 179/81 B |
| 4,560,840 | 12/1985 | Hansen | 179/81 B |
| 4,580,013 | 4/1986 | Moisin | 179/81 B |

Primary Examiner—Jin F. Ng
Assistant Examiner—Randall Vaas
Attorney, Agent, or Firm—C. B. Patti; V. L. Sewell; H. F. Hamann

[57] ABSTRACT

An analog echo suppression circuit is used with a telephony 2-wire circuit to 4-wire circuit interface. The 2-wire circuit carries a first signal and the 4-wire circuit carries a second signal. Each circuit has an input port and an output port. The interface produces an echo signal on the output of the 2-wire circuit when the second signal is received at the input port of the 2-wire circuit. A first communication channel connects the output of the 4-wire circuit to the input of the 2-wire circuit. A second communication channel connects the output of the 2-wire circuit to the input of the 4-wire circuit and series analog switches or transmission gates can interrupt the second channel. A comparator circuit receives the first and second signals from the first and second channels and has first and second outputs. First and second controller devices are operatively connected to the comparator circuit and provide signals such that, if an echo signal is present, the one analog switch interrupts the second channel and another analog switch grounds the input to the 4-wire circuit.

6 Claims, 2 Drawing Sheets

ANALOG ECHO SUPPRESSOR

BACKGROUND OF THE INVENTION

This invention relates in general to telephone communication circuitry and, in particular, to a problem of suppressing echo returned from an end of a four-wire transmission path due to the reflection of signals originating at the other end. The source of such echo is often an impedance mismatch at the hybrid circuit, which provides conversion from four-wire to two-wire transmission, at the end of the four-wire section.

Echo suppressors and their more sophisticated improvements, echo cancellers, are well known and widely used in long distance transmission. Existing echo suppressors make their decisions on the basis of the short-term average power level of two signals. This type of suppressor is relatively expensive and difficult to implement, particularly in digital form. The invention here uses peak signal level and a simple threshold memory, rather than average power, which yields much simpler less-expensive implementation.

Echo suppression is normally necessary only on circuits having a long delay. In the past, long delay could be equated to long distance. On relatively expensive long distance circuits the expense of a high-cost echo suppressor or echo canceller could be tolerated. With the advent of digital local transmission, and even voice transmission on local area networks originally designed for data, long delays requiring echo treatment can be generated even on low-cost local circuits where economical echo suppression is more important. A particular problem exists for telephone communication on a local area network which uses token passing or carrier sense multiple access techniques, and which, therefore, provides relatively long, sometimes variable delay times between burst transmissions. Virtual voice circuits, derived by means of local area networks, require both speed changing buffers and additional buffering to smooth out variable delays. In order to keep overhead requirements reasonable, packets, which are relatively long in voice terms, are used. For reasonable size buffers, absolute delays of several tens of milliseconds will occur even on local connections.

Local area networks are themselves typically four-wire, and echo might not occur; however, a practical local area network for voice must interface two-wire telephone circuits. Echo will occur at the two-wire to four-wire connection point. Therefore, echo control must be incorporated since the subjective effect of echo is increased by delay anywhere in the echo path and the buffers used in such networks produce delays sufficiently long to be troublesome.

The present invention provides a novel circuit for echo suppression which is particularly simple to implement in digital form compared with previous techniques. One embodiment of the present invention is a "half echo suppressor" or "split echo suppressor" which suppresses echo from one direction only. In the local area network application mentioned above, echo occurs only in one direction. In fact, in most applications, even if full, both-ended echo suppression is required, it is accomplished with two such devices, one at each end of the circuit, rather than a single device in the middle. An extension to a full echo suppressor is another embodiment of the present invention. Relating to this embodiment, the term "four-wire transmission" is used in the generic sense to denote a circuit having a separate path for each of the two directions of conversation whether derived on four conductors, three conductors, or by time or frequency division multiplexing or by other means, and whether or not the representation is analog or digital.

The preferred embodiment is an analog implementation of the invention; however, the invention can be practiced in analog or digital form.

SUMMARY OF THE INVENTION

The invention involves an echo suppression circuit for use in a four-wire digital telephony circuit in which exists an echo from a local or remote connection to a two-wire circuit or other echo source. The echo suppressor thus has two four-wire ports. Since the source of echo is often ultimately a two-wire subscriber line, the four-wire port on which returning echo is to be suppressed would normally be connected to the subscriber and is referred to as the subscriber port. The other four-wire port is referred to as the network port. Signals arriving at the network port are passed through to the subscriber port unaltered. Signals arriving from the subscriber may not be passed to the network unaltered depending on whether or not they are determined to contain echo or not.

The subscriber port and the network port each have an input and an output. A first communication channel connects the input of the network port to the output of the subscriber port.

A second communication channel connects the input of the subscriber port to the output of the network port and has a series analog switch or transmission gate which can interrupt the channel. A comparator circuit receives the first and second signals from the first and second channels and has first and second outputs. First and second controller devices are operatively connected to the comparator circuit and provide signals such that, if an echo signal is present, the analog switch interrupts the second channel and another analog switch grounds the network port output.

The decision to suppress or not suppress echo is made by differentiating between speaker and speaker echo by comparing the recent peak values of the two signals. The largest peak value from either signal is stored in a threshold circuit and subsequent peaks are compared to the stored threshold. If a larger peak is found, it replaces the threshold and the process continues. The signal making the correct threshold is reliably the speaker and the other signal is simply echo. The threshold is allowed to decay so that if the first party stops speaking and the other party starts speaking the new party can eventually exceed the decaying threshold and obtain transmission through the circuit even if the first party was much louder.

OBJECTS OF THE INVENTION

It is a general object of the present invention to provide an improved analog echo suppression circuit for use in a four-wire telephone circuit.

It is another object of the present invention to provide an echo suppression circuit which has less components than prior art systems and is cost effective to manufacture.

BRIEF DESCRIPTION OF THE DRAWINGS

The features of the present invention which are believed to be novel are set forth with particularity in the appended claims. The invention, together with further objects and advantages, may best be understood by reference to the following description taken in conjunction with the accompanying drawings, in the several figures of which like reference numerals identify like elements, and in which:

FIG. 3 is a diagram of digital control signals used in the FIG. 2 circuit.

DESCRIPTION OF THE PREFERRED EMBODIMENT

Figure 1:
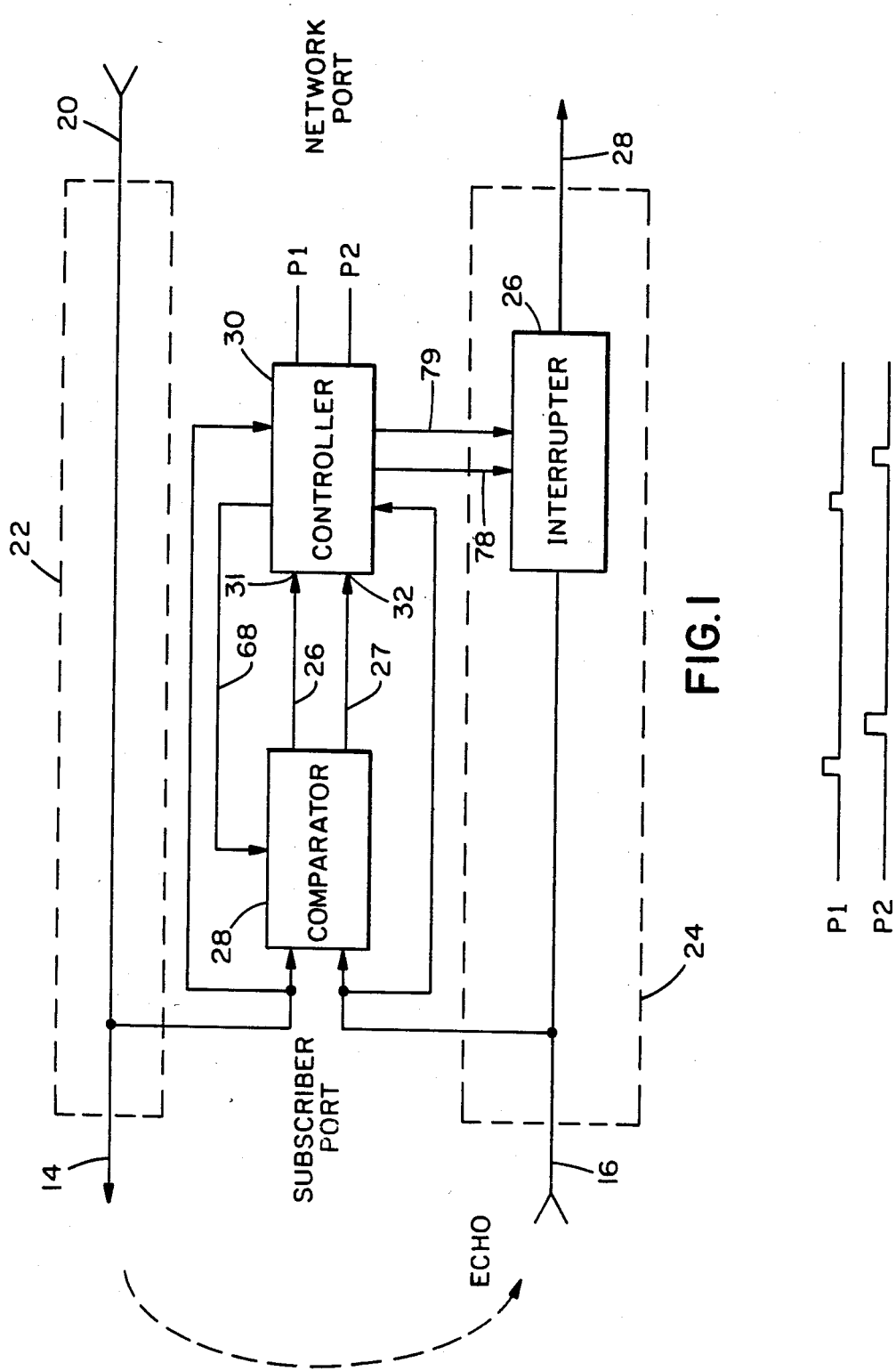
FIG. 1 is a general block diagram of the present invention.

The present invention provides a novel echo suppression circuit for use within a four-wire telephone communications circuit. In general terms and referring to FIG. 1, the subscriber port consists of an input 16 and an output 14. The system is assumed to be troubled by echo returned by the subscriber to input 16 as a result of signals transmitted toward the subscriber from output 14. The device also has a network port consisting of an input 20 and an output 28.

A first communication channel means 22 connects the network input 20 to the subscriber output 14. This first channel could be as simple as a single wire.

A second communication channel 24 connects the subscriber input 16 to the network output 28. The second channel 24 has an interruptor element 26 in series. A comparator circuit 28 receives the first and second signals from the network port input 20 and subscriber port input 16 and has two outputs 26 and 27. Controller device 30, has two inputs 31, 32 operatively connected to the outputs 26, 27 of the comparator circuit 28.

The controller also utilizes signals 16 and 20 and returns a threshold signal on line 68 to the comparator.

The controller circuit 30, controls the interruptor element 26. Such that, when an echo signal is present, the interrupter element 26 interrupts the second channel 24. Control commands are transmitted via two signals 78 and 79 to the interrupter. The following is a more detailed description and refers to FIGS. 2 and 3.

Figure 2:
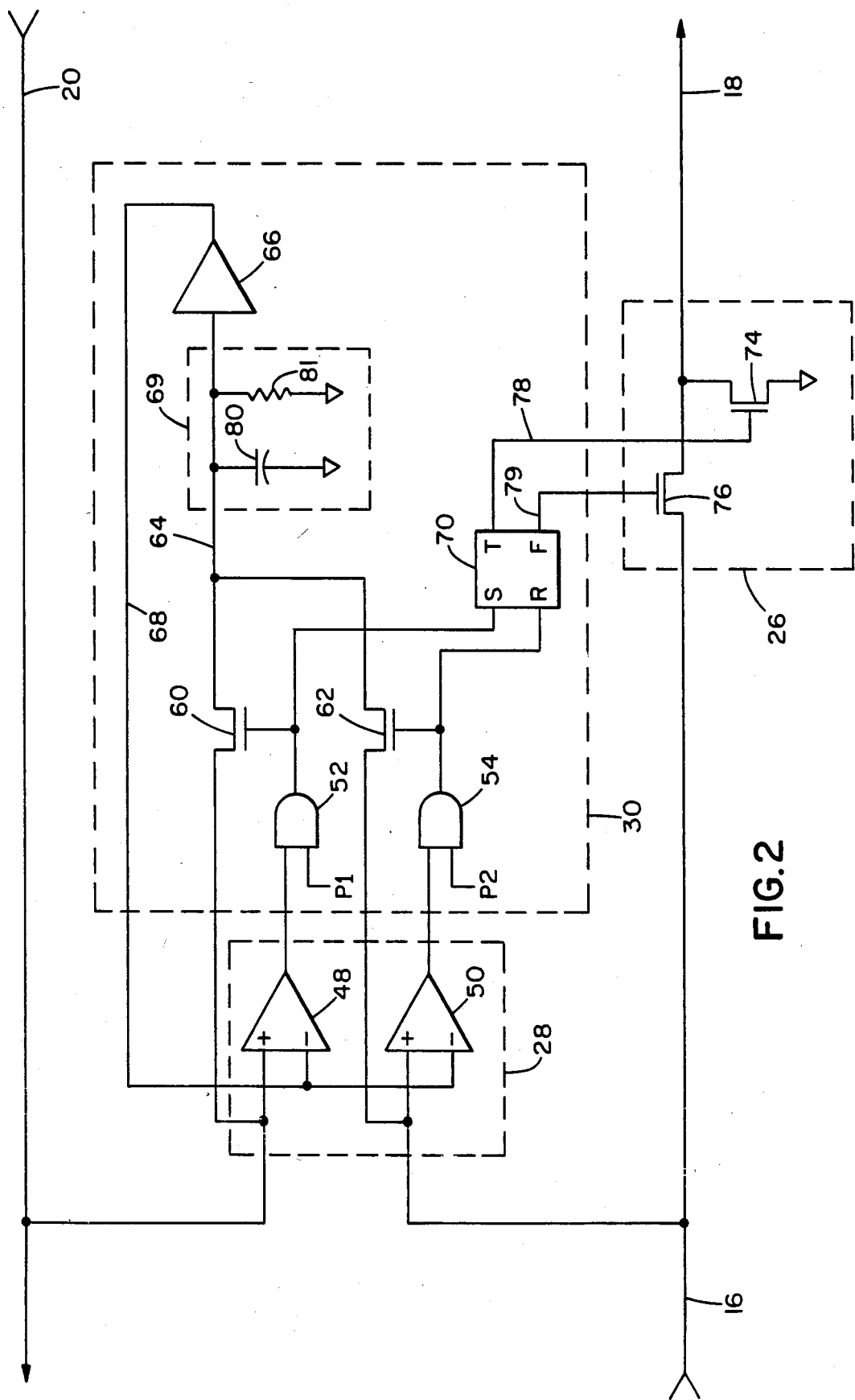
FIG. 2 is a circuit diagram of the FIG. 1 block diagram.

The more detailed circuit of FIG. 2 illustrates that the network port input signal 20 and the subscriber port input signal 16 are supplied to the positive inputs of comparator devices 48, 50, respectively. The outputs of the comparitors 48, 50 are supplied to AND gates 52, 54, respectively. The differential amplifiers produce a logic 1 output when the input labeled (+) is positive with respect to the input labeled (−), and a logic 0 output when that is not the case. Signals 20 and 16 are also supplied to the input terminal of analog switches 60, 62. The outputs of each of these switches 60, 62 are connected together in a common lead 64 to the input of an isolation amplifier 66 and to a resistor-capacitor (RC) storage circuit 69. The output of amplifier 66 is connected on a lead 68 to the negative inputs of the comparators 48, 50. The second inputs of each of the AND gates 52, 54 are connected to one of the two periodic pulsed signals P1, P2 as shown in FIGS. 2 and 3. Outputs of the AND gates are connected to the control lead inputs of the corresponding analog switches 60, 62 and also to the corresponding set and reset inputs of flip-flop 70, as shown in FIG. 2.

A pulse from AND gate 52 sets the true output 78 of flip-flop 70 to a logic 1 and resets the false output 79 to a logic zero. A pulse from AND gate 54 resets the true output 78 to a logic zero and sets the false output 79 to a logic ONE. True and False outputs of flip-flop 70 are signals on lines 78 and 79, and are connected to the control leads of respective analog switches 74, 76. The input to analog switch 74 is grounded and the input to analog switch 76 is connected to the subscriber port input 16. The outputs of both analog switches 74, 76 are connected to the network port output 18. The operation of the echo suppression circuit is such that when the echo signal is present on the output port 16, analog switch 74 grounds the network output 18 thus supplying a zero signal on toward the network. Analog switch 76 opens the circuit back toward the subscriber input 16 and prevents the ground supplied by switch 74 from interferring with the continuing operation of comparator circuit 50.

Comparator units 48 and 50 are standard devices which compare analog inputs and produce an logic level output. And gates 52 and 54 are standard logic devices. Isolation amplifier 66 can be mechanized with any common operational amplifier. Transmission gates 60, 62, 74 and 76 are depicted as insulated gate field-effect transistors and these devices can be used for this purpose. They should be chosen to be compatible with logic gates 52 and 54 such that a logic one level turns the transmission gates on producing a low resistance state from input to output and a logic zero level produces an open circuit or high resistance state from input to output.

Gate 76 could equally well be replaced with an uncontrolled isolation amplifier. Gate 74 could equally well be replaced with a bipolar transistor, or the combination of 74 and 76 could be replaced by a relay.

The operation of the circuit of FIG. 2 consists of alternately comparing signal 20 and signal 16 with signal 66 in comparators 48 and 50, respectively, upon the occurrence of the P1 and P2 pulses as shown in FIG. 3.

Just in case signal 20 or signal 16 exceeds the threshold signal on line 68, then the corresponding transmission gate 60 or 62 is activated by gate 52 or 54 and the input signal exceeding the threshold is stored as a new threshold on threshold capacitor 80. This signal soon appears on line 68 through the isolation amplifier 66, and in fact, for some choices of components and update rates, amplifier 66 may not be needed.

Concurrent with the operation of transmission gates 60 flip-flop 70 are set to a one condition. Concurrent with the operation of gate 62 flip-flop 70 is reset to a zero condition. Thus flip-flop 70 always indicates by a one output that the network input supplied the current threshold and by a zero output that the subscriber input supplied the correct threshold.

In case the network signal is louder, echo suppression should take place. Therefore, the T output of flip-flop 70 is connected to gate 74 and the F output to gate 76.

Resistor 81 permits the stored threshold capacitor 80 voltage to decay slowly. Thus, for example, the network speaker in order to maintain a suppressed condition must keep speaking to keep the voltage on capacitor 80 refreshed. If the network user stops speaking the voltage decays and the subscriber speaker can exceed the threshold, remove the suppression, and obtain transmission toward the network.

This invention can also be mechanized in digital form where it is particularly useful for signals all ready in digital form.

A full echo suppressor can also be realized by including in the first channel 22 an interrupter similar to that of the second channel 24. This additional interruptor is then controlled by the inverse of the signals controlling interruptor 30 so that when one channel is interrupted the other is not, and vice versa. The new interruptor is located near the output so that the signal 20 to comparitor 48 is not interrupted.

The speaker can also be chosen on the basis of sample pairs rather than by comparison of the samples to a threshold. This can be accomplished in FIG. 2 spacing the P1 and P2 pulses very close to each other in time with a relatively low frequency and then permitting the threshold to decay very rapidly. Thus the threshold stores essentially just the last sample. Of course a simpler solution would be a single comparator driving the interruptor directly with inputs 16 and 20. The circuit without a threshold does not work as well as one utilizing the threshold but may have some utility.

Another modification which does provide some improvement would include a rectifier element at the (+) inputs to comparitors 48 and 50, so that the algebraic sign of the signals is ignored and only the magnitude is compaired.

The invention is not limited to the particular details of the apparatus depicted and other modifications and applications are contemplated. Certain other changes may be made in the above-described apparatus without departing from the true spirit and scope of the invention herein involved. It is intended, therefore, that the subject matter in the above depiction shall be interpreted as illustrative and not in a limiting sense.

What is claimed is:

1. An echo suppression circuit for use in a four-wire telephony circuit, the circuit having a network port with a network input and a network output, and a subscriber port having a subscriber input and a subscriber output, the circut preventing echo present on the subscriber input from reaching the network output comprising:

first means for establishing a communication channel between the network input and the subscriber output;

second means for establishing a communication channel between the subscriber input and the network output and having means for interrupting said second channel means;

means for comparing having first and second inputs operatively connected, respectively, to said network port input and said subscriber port input, means for storing a threshold value and having an output indicative of a signal of the network input or the subscriber input exceeding the value stored in said threshold storage means, and first and second comparators, each having a negative input for receiving said value stored in said threshold storage means and each having a positive input operatively connected, respectively, to said network input and said subscriber input, and each having an output;

a pair of analog switches, each having a signal input, a control input, and an output, and a pair of AND gates, the signal inputs of the analog switches connected to said network input and said subscriber input, the outputs of said analog switches connected together and to said threshold storage means, the control inputs of said analog switches connected to the outputs of said pair of AND gates, one input of each of said AND gates driven by one of two periodic pulsed signals, and another input of each of said AND gates driven, respectively, by said output of said first and said second comparators;

means for storing an identity of said new value as the network input or subscriber input; and means for reducing the value stored in said threshold storage means, said means for interrupting controlled by said means for storing the identity of said new value.

2. The circuit of claim 1 wherein said threshold storage means is a capacitor.

3. The circuit of claim 2 wherein said means for reducing the value stored in said threshold storage means is a resistor.

4. The circuit of claim 2 wherein said threshold storage means has an isolation amplifier.

5. The circuit described in claim 1 wherein said means for storing the identity of said new value is a flip-flop operatively connected to the outputs of said pair of AND gates.

6. The circuit described in claim 1 wherein said means for interrupting consists of a pair of analog switches operatively connected to said identity storing means.

* * * * *